United States Patent
Lifson et al.

(10) Patent No.: US 7,721,562 B2
(45) Date of Patent: May 25, 2010

(54) REFRIGERANT SYSTEM WITH MULTI-SPEED SCROLL COMPRESSOR AND ECONOMIZER CIRCUIT

(75) Inventors: Alexander Lifson, Manlius, NY (US); Michael F. Taras, Fayetteville, NY (US)

(73) Assignee: Scroll Technologies, Arkadelphia, AR (US)

( * ) Notice: Subject to any disclaimer, the term of this patent is extended or adjusted under 35 U.S.C. 154(b) by 1124 days.

(21) Appl. No.: 11/302,909

(22) Filed: Dec. 14, 2005

(65) Prior Publication Data

US 2007/0130973 A1    Jun. 14, 2007

(51) Int. Cl.
F25B 41/00    (2006.01)
F25B 49/00    (2006.01)
F25B 1/00    (2006.01)

(52) U.S. Cl. ............... 62/196.3; 62/196.2; 62/228.4

(58) Field of Classification Search ........... 62/196.2, 62/196.3, 196.4, 228.4, 513, 197, 509
See application file for complete search history.

(56) References Cited

U.S. PATENT DOCUMENTS

| | | | | |
|---|---|---|---|---|
| 6,058,729 A * | 5/2000 | Lifson et al. | ........... | 62/217 |
| 6,474,087 B1 * | 11/2002 | Lifson | ........... | 62/199 |
| 2003/0000237 A1 * | 1/2003 | Hansen | ........... | 62/228.4 |
| 2005/0086957 A1 | 4/2005 | Lifson et al. | | |

FOREIGN PATENT DOCUMENTS

| WO | 2005119141 A1 | 12/2005 |
|---|---|---|
| WO | 2006118573 A1 | 11/2006 |
| WO | 2006132638 A1 | 12/2006 |

OTHER PUBLICATIONS

European Search Report Oct. 1, 2007.

* cited by examiner

*Primary Examiner*—Chen-Wen Jiang
(74) *Attorney, Agent, or Firm*—Carlson, Gaskey & Olds

(57) ABSTRACT

A scroll compressor is provided with a multiple-speed motor. A control selects a speed for operating the motor, along with selecting between several available options for the system capacity adjustment to meet external load demands in a most efficient and reliable manner. The disclosed embodiment includes an economizer circuit, an unloader function, and an optional suction modulation valve. By utilizing each of these features in combination with the multi-speed motor for the compressor, the present invention is better able to tailor provided capacity to desired capacity.

14 Claims, 2 Drawing Sheets

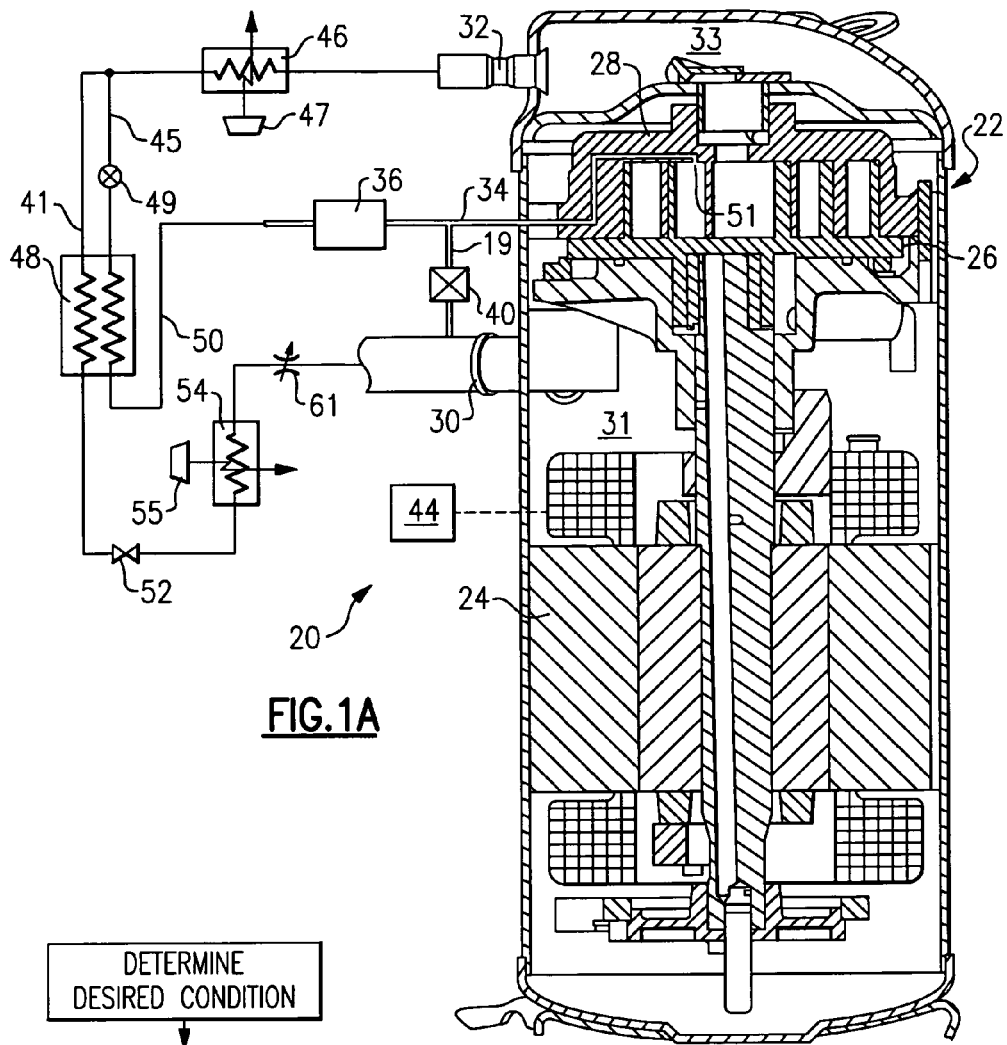
FIG.1A
FIG.1B
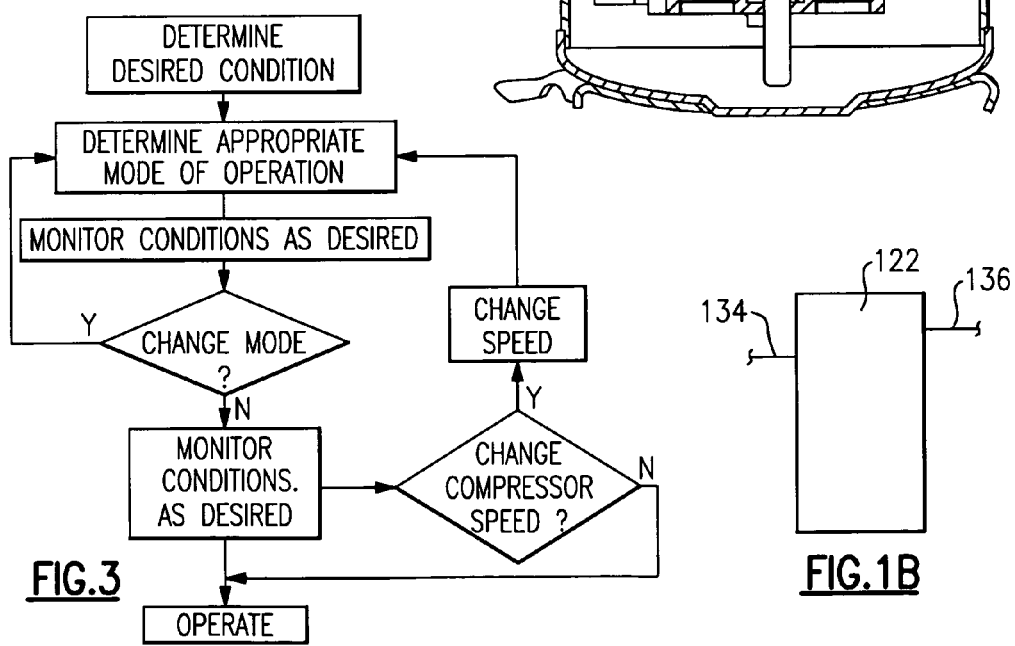
FIG.3

REFRIGERANT SYSTEM WITH MULTI-SPEED SCROLL COMPRESSOR AND ECONOMIZER CIRCUIT

BACKGROUND OF THE INVENTION

This invention relates to a two-speed scroll compressor that is operable in a refrigerant system with an economizer function and other means of capacity modulation.

Refrigerant systems are utilized in many applications to condition an environment. In particular, air conditioners and heat pumps are employed to cool and/or heat a secondary fluid such as air entering an environment. The cooling or heating load of the environment may vary with ambient conditions, occupancy level, other changes in sensible and latent load demands, and as the temperature and/or humidity set points are adjusted by an occupant of the building.

Thus, refrigerant systems can be provided with sophisticated controls, and a number of optional components and features to adjust cooling and/or heating capacity. Known options include the ability to bypass refrigerant which has been at least partially compressed by a compressor back to a suction line. This function is also known as an unloader bypass function. This additional step in operation is taken to reduce system capacity.

Another option includes a so-called economizer cycle. In an economizer cycle, a main refrigerant flow heading to an evaporator is subcooled in an economizer heat exchanger. The main refrigerant flow is subcooled by a tapped refrigerant that is expanded to some intermediate pressure and temperature levels and then passed through the economizer heat exchanger. This tapped refrigerant is then returned to a compressor at an intermediate point in the compression cycle. Thus, the economizer cycle provides an additional step in operation to vary system capacity by switching between economized and other modes (or steps) of operation.

In the prior art, controls can be programmed to optionally actuate any one of these various control functions. However, the capacity provided by these functions is increased or decreased in relatively large discrete steps. It would be desirable to provide the ability to vary the capacity while the system is running at any of the above described modes of operation, in order to more closely match external load demands.

Motor drives are known for driving compressors at two speeds in a refrigerant system. By driving the compressor at a higher or lower speed, the amount of refrigerant that is compressed and circulated throughout the system changes, and thus the system capacity can be changed accordingly.

One increasingly popular type of compressors is a scroll compressor. In a scroll compressor, a pair of scroll members orbits relative to each other to compress an entrapped refrigerant. One design configuration of a scroll compressor utilizes both economizer and various unloader functions. Further, this scroll compressor may employ a single intermediate port to provide both functions alternatively or simultaneously. This scroll compressor is disclosed in U.S. Pat. No. 5,996,364.

However, scroll compressors have not been utilized in combination with a two-speed drive for its motor and an economizer cycle to obtain additional flexibility in system operation and control.

SUMMARY OF THE INVENTION

In a disclosed embodiment of this invention, a scroll compressor is provided in a refrigerant system with an economizer circuit. The scroll compressor has a motor that can be driven at multiple discreet speeds. For illustration purposes, the discussion below deals with a two-speed motor. However, the scroll compressor can be run at more than two distinct speeds. By selectively utilizing the economizer circuit, and/or an optional unloader function, the controller can increase or decrease the capacity of the refrigerant system. Further, by varying the speed of the motor, system capacity within each mode of operation can be adjusted to provide additional control flexibility.

A controller identifies a desired capacity level, and then achieves this desired capacity level by actuating the economizer circuit, if increased capacity is desired, or not actuating the economizer cycle if extra capacity is not required, or providing additional means of unloading to reduce the capacity even further, and determining a desired motor speed for achieving the exact capacity level. Since the refrigerant compressor provides efficient and reliable operation only within a certain speed range, additional steps of capacity correction, such as the unloader function, with or without the economizer circuit engaged, may be desired and similarly utilized with the corresponding compressor motor speed adjustment to closely control the capacity level or achieve more efficient unit operation. Additionally, the controller may monitor the system efficiency level and select the most desirable mode of operation and motor speed. In this case, both capacity and efficiency considerations are taken into account to establish the optimum unit operation.

By providing the two-speed drive in combination with the capacity adjustment options mentioned above, the present invention allows an end user to closely tailor the system capacity and/or efficiency, or a combination of these two parameters, to a desired level. As also known, an additional throttling device, often called a suction modulation valve (SMV) may be provided to further reduce the capacity to the level below the level that would be normally achievable through the unloading mechanisms and reduction in motor speed.

These and other features of the present invention can be best understood from the following specification and drawings, the following of which is a brief description.

BRIEF DESCRIPTION OF THE DRAWINGS

FIG. 1A shows a first embodiment refrigerant cycle.
FIG. 1B is another embodiment.
FIG. 3 is a flow chart.

DETAILED DESCRIPTION OF THE PREFERRED EMBODIMENT

Figure 2A:
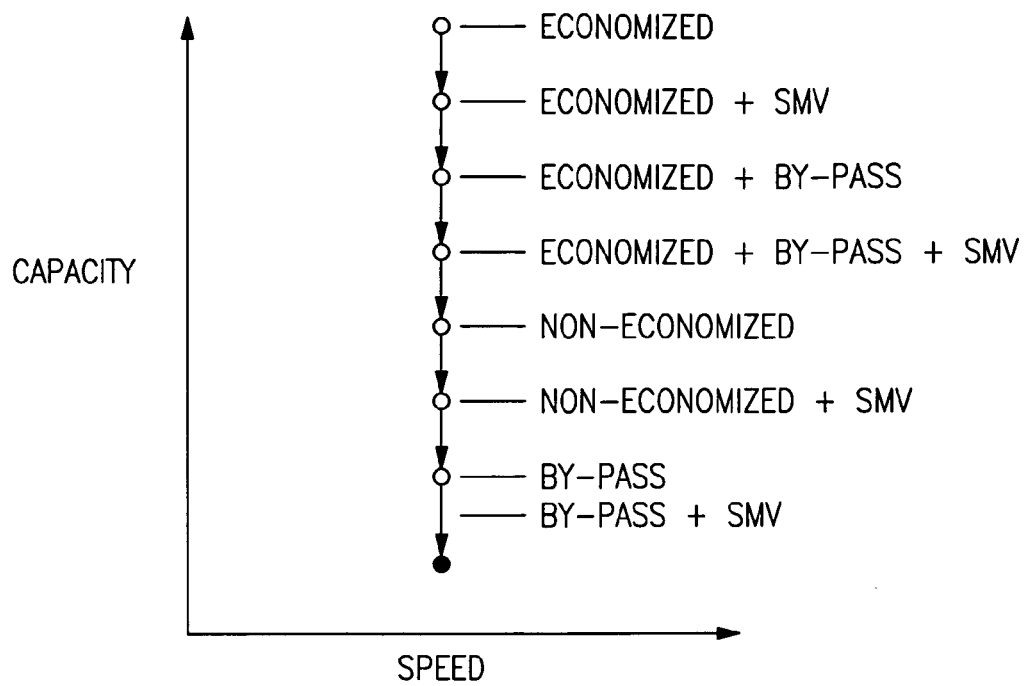
FIG. 2A shows a graph of the capacity provided by the prior art.

A refrigerant system 20 is illustrated in FIG. 1A having a compressor 22 and a controller 44. As is known, a motor 24 for the compressor 22 can be driven at two speeds such that the amount of refrigerant compressed and circulated throughout the system by the compressor 22 can be varied. That is, the compressor can be driven at one of two non-zero speeds at steady state operation. The compressor 22 is a scroll compressor having an orbiting scroll member 26 and a non-orbiting scroll member 28. As is known, a number of compression chambers are defined between the two scroll members to compress an entrapped refrigerant when the orbiting scroll member 26 is driven to orbit by the electric motor 24. As can be seen, a suction tube 30 leads refrigerant into a suction chamber 31 surrounding the motor and leading into the compression chambers. Once the refrigerant is compressed, it is driven into a discharge chamber 33 communicating with a discharge port 32. The general structure of a scroll compressor is known. As also shown, an injection line 34, to be disclosed below, communicates with a port (or ports) 51 that is positioned at an intermediate compression point.

Refrigerant compressed by the compressor 22 is discharged from the discharge port 32, and then to an outdoor heat exchanger 46, which would be the condenser in a cooling mode. Fan 47 moves air over the heat exchanger 46. Downstream of the condenser 46 is an economizer heat exchanger 48. The economizer heat exchanger 48 may be a conventional heat exchanger or may be of a flash tank type. As is known, the economizer heat exchanger receives a tapped refrigerant from a tap line 45 passing through an economizer expansion device 49, and a main refrigerant from a liquid line 41. Although the two refrigerant streams are shown flowing in the same direction in FIG. 1, this is merely to simplify the illustration. In practice, it is generally preferred to have the two flows flowing in a counterflow arrangement.

The tapped refrigerant in the tap line 45 subcools the refrigerant in the liquid line 41, such that after passing through a main expansion device 52, it will have a higher cooling potential prior to entering an evaporator 54. Fan 55 moves air over the evaporator 54. From the evaporator 54, the refrigerant returns to a suction line 30 leading back to the compressor 22. An optional suction modulation valve 61 can be positioned in the suction line 30 between the compressor 22 and evaporator 54. The tapped refrigerant from the tap line 45 passes through the return injection line 34 to enter the intermediate compression point or injection port (or plurality of ports) 51 in the compressor 22. A bypass line 19 may selectively bypass refrigerant from the compressor 22 back to the suction line 30 when a bypass valve 40 is opened. It should be understood that the economizer expansion device 49 also preferably incorporates a shutoff feature, or a separate shutoff device 36 is provided. When the bypass valve 40 is opened, the shutoff device 36 is preferably closed, and when the shutoff device 36 is opened, the bypass valve 40 is typically closed; however, it is also possible to operate with both shutoff valve 36 and bypass valve 40 open. As shown, the same port of the injection line 34 can be used to deliver the refrigerant from the economizer heat exchanger as well as to bypass the refrigerant back to the suction line. Of course, if so desired, the bypass and refrigerant injection functions can utilize different ports, instead of the common port 51.

As is known, the bypass valve 40 is opened when part-load capacity of the compressor 22 is desirable. Thus, partially compressed refrigerant is returned to the suction line 30, and the cooling capacity of the refrigerant system is reduced. If a capacity increase is desired, then the bypass valve 40 is closed. If even further capacity augmentation is desired, then the bypass valve 40 is closed and the economizer expansion device 49 (or shutoff device 36) is opened to provide the economizer function. An enhanced capacity is then provided.

A control 44 for refrigerant cycle 20 is able to identify a desired cooling capacity, and operate the bypass function and/or the economizer function as necessary. Thus, as shown in FIG. 2A, the prior art system provides varying stages of capacity. One stage corresponds to operation in the economized mode; another stage corresponds to operation in the economized and bypass modes engaged at the same time; still another stage corresponds to non-economized mode; and yet another stage corresponds to the bypass mode of operation. If there is an additional SMV present, then, as shown, by throttling the SMV between the modes of operation mentioned above the capacity can be adjusted between these modes. However, the SMV operation is inefficient, and in general should be avoided if possible.

Figure 2B:
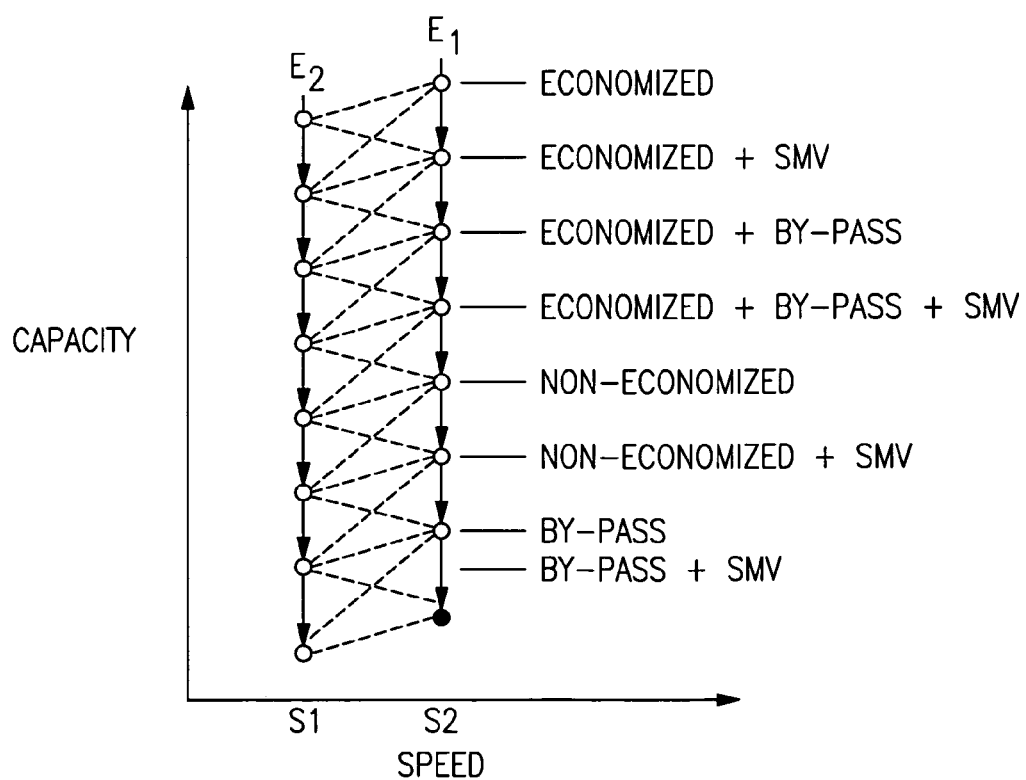
FIG. 2B shows a graph of the capacity provided by the invention.

When the system of FIG. 1A includes a two-speed compressor motor, then there can be additional capacity control between the base values, with or without the use of SMV. Thus, as shown in FIG. 2B, if the system was operating at maximum capacity at point E1 (which would normally correspond to economized circuit engaged and the compressor running at a maximum speed) by reducing the speed of the compressor the capacity can be reduced to point E2. If further reduction is desired the compressor speed is adjusted and the switch is made to the economized mode with one of the available unloader option (for instance, bypass) engaged.

The control 44 controls each of these options and changes the speed (see FIG. 3) of the compressor motor between the two available speeds to achieve a capacity, which closely matches the needed capacity. Although the control can change mode or speed under any algorithm that may determine the most desired operation, the mostly preferred control logic would be based on efficiency and reliability considerations. The present invention is thus able to better tailor the provided capacity to the required capacity to meet external load demands by utilizing each of these several options.

FIG. 1B shows another embodiment, wherein the compressor 122 is shown schematically, but wherein the economizer injection line 134 and the unloader line 136 communicate with distinct ports in the compressor 122. This figure shows this feature somewhat schematically (note that suction and discharge port of the compressor 122 are not exhibited), but a worker of ordinary skill in the art would recognize how, to achieve this structure.

In further aspects, it is known to make the economizer and unloader functions continuously adjustable. Still, providing a two-speed compressor will allow even more flexible, reliable and efficient operation to be achieved. Also, as mentioned above, a multi-speed motor (in place of a two-speed motor) can be incorporated intro the compressor design to provide an additional degree of flexibility.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:
   at least one compressor having a multi-speed drive for providing multiple speeds for said compressor, and said compressor being provided with a suction port, an intermediate pressure port and discharge port;
   a condenser downstream of said compressor, a main expansion device downstream of said condenser, an evaporator downstream of said main expansion device, with an economizer circuit containing an economizer expansion device and an economizer heat exchanger and positioned intermediate to said condenser and said evaporator, said economizer circuit selectively returning a tapped refrigerant to said compressor;
   a control for selectively operating said economizer circuit to deliver a tapped refrigerant through said economizer heat exchanger, and back to said compressor, and said control also selecting a speed of said compressor to achieve various levels of capacity, said control being programmed to select between available modes of operation, said available modes of operation including at least operation with said economizer circuit operational, and without said economizer circuit operational, and said control first selecting a mode to best achieve desired conditions for an environment to be conditioned, then varying a speed of the motor if further variation is required to meet the desired conditions; and there is a suction modulation valve located downstream of said evaporator and its operation is one of the modes of operation.

2. The refrigerant system as set forth in claim 1, wherein a multi-speed drive is a two-speed drive.

3. The refrigerant system as set forth in claim 1, wherein said compressor is a scroll compressor.

4. The refrigerant system as set forth in claim 1, wherein said tapped refrigerant is returned to said intermediate compression port.

5. The refrigerant system as set forth in claim 1, wherein the delivery of said tapped refrigerant is controlled by a flow control device.

6. The refrigerant system as set forth in claim 1, wherein said control operates under an operational mode sequence to utilize the multi-speed drive and the economizer circuit based on efficiency and reliability considerations.

7. A refrigerant system comprising:

at least one compressor having a multi-speed drive for providing multiple speeds for said compressor, and said compressor being provided with a suction port, an intermediate pressure port and discharge port;

a condenser downstream of said compressor, a main expansion device downstream of said condenser, an evaporator downstream of said main expansion device, with an economizer circuit containing an economizer expansion device and an economizer heat exchanger and positioned intermediate to said condenser and said evaporator, said economizer circuit selectively returning a tapped refrigerant to said compressor;

a control for selectively operating said economizer circuit to deliver a tapped refrigerant through said economizer heat exchanger, and back to said compressor, and said control also selecting a speed of said compressor to achieve various levels of capacity, said control being programmed to select between available modes of operation, said available modes of operation including at least operation with said economizer circuit operational, and without said economizer circuit operational, and said control first selecting a mode to best achieve desired conditions for an environment to be conditioned, then varying a speed of the motor if further variation is required to meet the desired conditions; and wherein a bypass port is also provided for said compressor to selectively bypass at least a portion of partially compressed refrigerant from said compressor back to a suction line for said compressor and its operation is one of the available modes.

8. The refrigerant system as set forth in claim 7, wherein said bypass port and said intermediate pressure port are provided by the same port.

9. The refrigerant system as set forth in claim 8, wherein said bypass port selectively communicates an intermediate pressure line receiving said tapped refrigerant back to a suction line leading to said compressor.

10. The refrigerant system as set forth in claim 7, wherein the delivery of said bypass refrigerant is controlled by a flow control device.

11. A method of operating a refrigerant system having at least one multi-speed compressor and at least one economizer circuit;

first determining a desired load on said refrigerant system, and determining whether said economizer circuit should be engaged to meet said desired load or should be left off as possible modes of operation;

then varying a speed of said compressor to meet said desired load if further variation is required to meet the desired conditions; and wherein said compressor is further provided with an unloader function, and both said unloader function and said economizer circuits providing modes to meet said desired load.

12. The method as said forth in claim 11, wherein the multi-speed compressor is a two-speed compressor.

13. The method as set forth in claim 11, wherein a control operates said economizer circuit and said multi-speed compressor utilizing an operation mode sequence based upon efficiency and reliability considerations.

14. A method of operating a refrigerant system having at least one multi-speed compressor and at least one economizer circuit;

first determining a desired load on said refrigerant system, and determining whether said economizer circuit should be engaged to meet said desired load or should be left off as possible modes of operation;

then varying a speed of said compressor to meet said desired load if further variation is required to meet the desired conditions; and wherein a suction modulation valve is also provided, and is actuated as one of the modes to vary the operational function of the refrigerant system to meet said desired load.

* * * * *